April 4, 1950         W. F. HENDERSON      2,502,841
METHOD OF MODIFYING THE SURFACE CHARACTERISTICS
OF POLYETHYLENE STRUCTURES AND PRODUCT
RESULTING THEREFROM
Filed Feb. 5, 1946
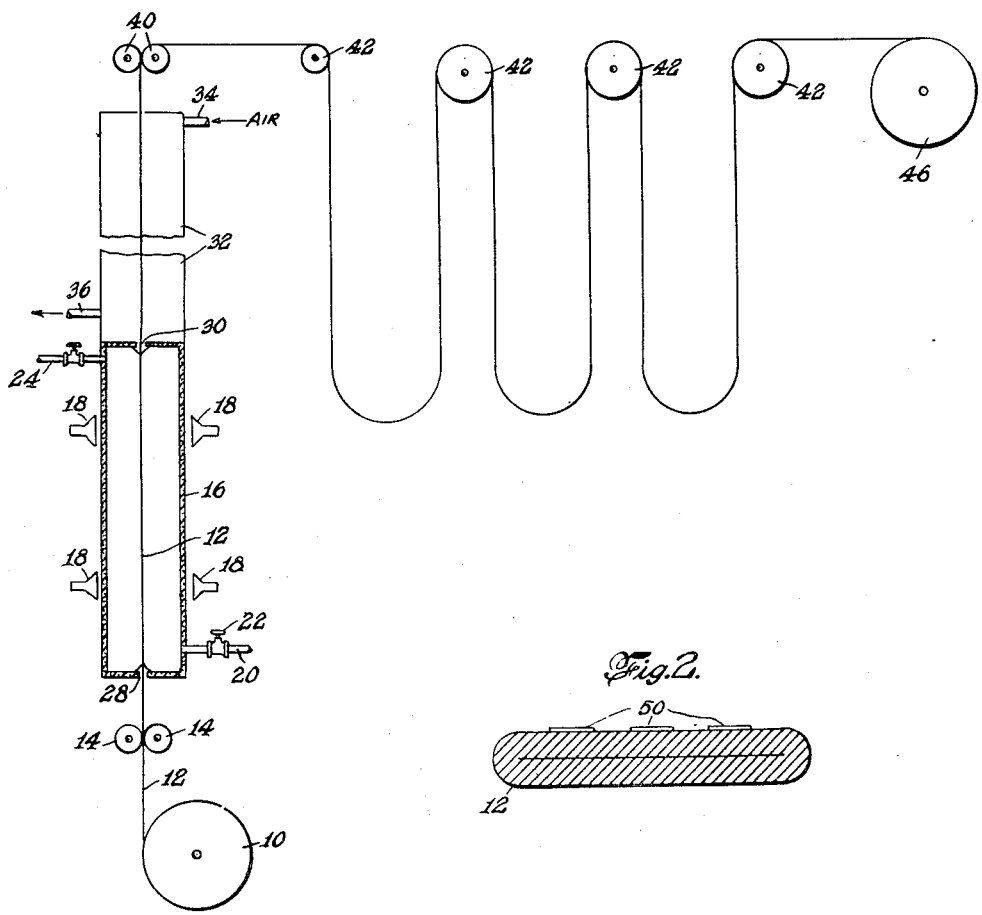
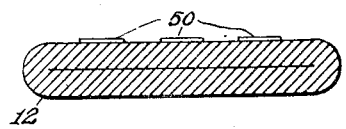
INVENTOR.
WILLIAM F. HENDERSON
BY
*Wm. S. Pritchard*
ATTORNEY.

Patented Apr. 4, 1950

2,502,841

UNITED STATES PATENT OFFICE 2,502,841

METHOD OF MODIFYING THE SURFACE CHARACTERISTICS OF POLYETHYLENE STRUCTURES AND PRODUCT RESULTING THEREFROM

William F. Henderson, Chicago, Ill., assignor to The Visking Corporation, Chicago, Ill., a corporation of Virginia Application February 5, 1946, Serial No. 645,697

9 Claims. (Cl. 117—118)

This invention relates to printing polyethylene structures. More particularly, it relates to polyethylene structures in which the surface which is to receive the ink impressions has been modified so that the dried ink impressions will firmly and tenaciously adhere thereto, and to the method of preparing such surface.

U. S. Patent 2,153,553 discloses a solid polymer consisting of polymerized ethylene. Such polymer is known as "polyethylene," and an outstanding property thereof is its chemical inertness upon contact with inorganic acids and alkalies either in the cold or at 80° C.-90° C. Such polymer is also insoluble in many solvents, such as water, ethanol, amyl alcohol, ethyl ether, acetone, chloroform and glycerin. It is also incompatible with drying oils, such as linseed oil, and with nitrocellulose.

Recently there has been devised a process wherein polyethylene is extruded from a melt to form a thin-walled, seamless tubing which is collected, in a flattened state, on a reel. Because of the aforementioned properties and other properties of polyethylene. such tubing is admirably suitable for use as a packaging material, such as, for example, envelopes, bags, pouches, etc. Similarly, self-sustaining sheeting of polyethylene is also admirably suitable for packaging and wrapping purposes.

Up to the present time, the use of polyethylene film, either in the form of sheeting or seamless tubing, as a wrapping or packaging material has been restricted. A packaging or wrapping material, in order to attain extensive and widespread use, must be of a type and nature so that various indicia, particularly trade-marks, advertising indicia, receipes, etc., can be imprinted thereon by the usual printing processes utilizing printing inks of either oil or lacquer types and the dried ink impressions will firmly adhere thereto and effectively resist removal upon abrasion and other treatments to which the printed film will be subjected during its life, i. e. from the time it is printed until it reaches the consumer or user of the contents wrapped or packaged therein. Because of the paraffin-like surface properties and the other previously mentioned properties, polyethylene in the form of film cannot be satisfactorily printed with inks of the oil or lacquer types normally used for printing non-fibrous cellulosic materials. When polyethylene film is so printed, the dried ink impressions do not adhere firmly to the polyethylene surface. Slight abrasion, such as gentle scraping with the back of the finger nail, removed the dried ink impressions with very little effort. Also, when such printed film was stretched, the ink cracked and practically fell off. As a consequence, during the useful life of the printed film as a wrapping material the dried ink impressions were more or less removed and the package presented an unattractive appearance.

Due to the non-polar character of polyethylene, it was believed that the incorporation of very small amounts of a polar material, such as chlorinated polyethylene, copolymerized vinyl acetate-vinyl chloride, etc., prior to film production, would render improvement of the ink adhesion of the film. However, when this was tried, no measureable improvement in ink adhesion was obtained.

An object of this invention is to provide a polyethylene structure having improved surface characteristics.

Another object of this invention is to provide a polyethylene structure having a surface to which dried ink impressions will firmly and tenaciously adhere.

An additional object of this invention is to provide a polyethylene film in which the surface thereof has been modified, preferably without dulling or impairing the transparency of the film, so that upon being printed in the usual manner with either oil or lacquer type printing inks the dried ink impressions will firmly adhere thereto and effectively resist removal upon abrasion.

A further obect of the invention is to provide a printed polyethylene structure wherein the dried ink impressions firmly adhere to said structure and effectively resist removal upon abrasion.

A still further object of this invention is to provide a method of modifying the surface of a polyethylene structure so that dried ink impressions of printing inks normally used for printing cellulosic films and of either the oil or lacquer types will firmly adhere thereto and resist abrasion and the normal treatments to which the structure is subjected during its life.

Other and additional objects of this invention will become apparent hereinafter.

The objects of this invention are accomplished, in general, by chlorinating the surface of the polyethylene film which is to be imprinted to a degree that the original transparency of the film is not affected. In one embodiment, the surface of a transparent polyethylene film, which is to be imprinted, is exposed to free gaseous chlorine in the presence of or under the influence of light (illumination) for such a period of time that the surface is chlorinated and the original transparency of the film is not substantially dulled or impaired, and thereafter the chlorine-containing gases, such as hydrogen chloride, which were formed during the reaction and any unreacted chlorine are removed from the film.

The presence of hydrogen chloride in the film indicates that a chemical reaction occurred between the polyethylene and the chlorine. Without limiting the invention to the precise nature of the reaction but merely for the purpose of a possible explanation, it is believed that the chlorine replaces the hydrogen in the molecule of the polyethylene, and in this manner the chlorine becomes attached to the carbon atoms of the polyethylene molecule and the displaced hydrogen combines with the chlorine to form hydrogen chloride.

No special type of apparatus is required for carrying out the process. In general, the apparatus can comprise a reaction chamber in which the gaseous chlorine is introduced and through which the film is continuously passed. The reaction chamber is provided with a transparent lid or transparent side walls and sources of light, such as flood lamps, positioned adjacent thereto whereby the light rays emitted therefrom can impinge on the surface of the film. The film is passed through the reaction chamber at such a rate of speed that the required degree of chlorination is obtained. After passing from the reaction chamber, the treated film is passed through a tunnel through which air is flowed. The air removes the hydrogen chloride and any excess of chlorine. Residual gases are removed from the film by storing the film in well ventilated areas.

The present invention will be more clearly understood by reference to the following detailed description when taken in conjunction with the following drawings, and in which:

Figure 1 is a diagrammatic side elevation of an apparatus for carrying out the process, and Figure 2 is an exaggerated cross-section of the printed polyethylene seamless tubing in collapsed form.

Referring now to the drawings wherein like reference characters designate like parts, the reference numeral 10 designates a roll of collapsed transparent polyethylene seamless tubing 12. The collapsed seamless tubing 12, having a wall thickness of from .0005" to .003", can be prepared in any appropriate manner, such as, for example, by the apparatus and methods disclosed in copending applications Serial Nos. 623,470 and 623,472 filed on October 20, 1945, now United States Letters Patent Nos. 2,461,975 and 2,461,976, respectively.

The collapsed tubing 12 is unwound from the roll 10 thereof by a pair of feed rolls 14 from which the film passes into a reaction chamber 16. In the form shown, the reaction chamber 16 is a vertical tower having two opposite sides made of glass to permit the passage of light. Flood lamps 18 of the type having built-in reflectors are provided adjacent to but in spaced relationship with each of the glass sides to provide the necessary light. The tower 16 is provided with an inlet 20 connected to an appropriate source of supply (not shown) of chlorine gas. A valve 22 controls the feed of the chlorine gas into the tower from the source of supply. The tower 16 is also provided with a valved outlet 24 through which, upon the proper manipulation of the valve, the interior of the tower 16 can be freed of the gaseous atmosphere therein or through which the air, which is displaced at the beginning of the process by the chlorine, passes from the tower.

At the bottom, the tower 16 is provided with a sealed inlet 28 through which the collapsed tubing 12 passes to enter the tower. At the top, the tower 16 is provided with a similar sealed outlet 30 through which the collapsed tubing passes in leaving the tower. The seals 28 and 30 are of the type which permit the passage of the collapsed tubing therethrough to prevent the escape of gases therethrough.

After the collapsed tubing 12 leaves the tower 16, it passes into a tunnel 32 through which air is rapidly circulated. The air is introduced into the tunnel 32 through the inlet 34 in any suitable manner and the air ladened with chlorine-containing gases, i. e. hydrogen chloride and chlorine, leave the tunnel through the outlet 36. When the gaseous chlorine and hydrochloric acid are to be recovered, the air ladened with such gases after passing through the outlet 36 is appropriately treated therefor.

The collapsed film is fed continuously through the tower 16 and the tunnel 32 by a pair of feed rolls 40 which are driven at the same peripheral speed as the feed rolls 14.

Upon leaving the feed rolls 40, the treated collapsed tubing is stored in well ventilated areas where the residual gases in the film are permitted to escape. In the form shown, the collapsed tubing 12 after leaving the feed rolls 40 is festooned in a well ventilated area over a plurality of rolls 42, and thereafter wound onto a reel 46. The peripheral speed of the rolls 42 is substantially the same as that of the feed rolls 40.

The height of the tower 16 and the rate of travel of the collapsed tubing 12 therethrough is such that the collapsed tubing 12 will be in contact with the gaseous chlorine atmosphere for a period sufficient to modify the exposed surfaces of the film so that upon being imprinted with an ink, of either the lacquer or oil types, normally used for printing non-fibrous cellulosic material and thereafter dried, the dried ink will firmly adhere to the film.

The size of the tunnel 32 and the rate of flow of air therein are corelated so that a relatively large quantity of air will flow rapidly therethrough.

The collapsed tubing 12, treated as above described, is then printed in the usual manner with printing inks, such as are used in printing cellulosic films, and of either the drying oil or lacquer types, in accordance with any desired indicia, and thereafter the ink impressions 50 are dried in the usual manner.

The details and manner of practicing the invention will become apparent from the following specific example, it being understood that the example is an illustrative embodiment and that the scope of the invention is not restricted thereto.

*Example*

In an apparatus such as previously described, each of the opposite glass walls was formed of a pane of $\frac{1}{16}$" Pyrex glass. A pair of General Electric flood lamps, each equivalent to 1500 watts and having built-in reflectors so that the light from each was concentrated in a circle 10" in diameter at a distance of 8", were positioned exteriorly of each wall and at a distance of 8" from the film. The tower was at room temperature (70° F.). The temperature of the film therein was in the neighborhood of 70° F. The chlorine in the tower 16 replaced the air therein and the pressure thereof was 1 atmosphere. Under such conditions of room temperature and pressure, the concentration was of the order of 83 grams of chlorine per cubic foot.

A collapsed, seamless, bright and transparent polyethylene tubing of 4.5 mils wall thickness was fed through the tower at such a rate that the tubing was in contact with the chlorine gas in the tower for a period of 10 seconds.

The volume of air flowed through the tunnel 32 was such that, after the tubing passed from such tunnel, the tubing contained only slight traces of chlorine-containing gases, i. e. hydrogen chlorine and chlorine, which were removed during the festooning and storage in well ventilated areas. Thereafter, the collapsed tubing, which was transparent and bright and had a chlorine content of 0.5%, was printed in the same manner and with the same inks employed with regenerated cellulose seamless tubing.

The dried ink impressions firmly and tenaciously adhere to the film. They cannot be removed by gentle scratching with the finger nail. As a matter of fact, an active scratching with the finger nail is necessary and even then it is difficult to detach the ink from the film without damaging the film. They successfully resist removal by abrasion and such other treatments to which the printed film is subjected during its life until it reaches the consumer.

In the example, the time of exposure, under the conditions set forth, of the film to the gaseous chlorine was 10 seconds, but it is to be understood that even under such conditions the invention is not restricted to such time. Under the same conditions set forth in the example, satisfactory results have been obtained when the time of exposure of the film to the gaseous chlorine was as low as 6 seconds.

The time of exposure of the surface of the polyethylene film to the free gaseous chlorine (period of reaction) is important. Prolonged exposure (reaction) dulls the surface in a manner as if the surface were etched and destroys the original transparency of the film. In the present method, the relatively short period of time of the reaction between the film and gaseous chlorine confines the reaction, which is an extremely slight chlorination, to the surface of the film just where it is needed to produce the ink adhesion without affecting the original transparency of the film.

As shown by the example, the preferred percentage of chlorine in a polyethylene tubing (4.5 mils wall thickness) is 0.5%. It is, however, to be understood that the invention is not restricted to such percentage of chlorine. With polyethylene films 4.5 mils thick, the percentage of chlorine in the product which imparts the desired ink adhesion properties to the film without destroying the original transparency thereof can be as low as 0.3% or as high as 1.0%.

The invention is not restricted to polyethylene films of any precise thickness. Since the chlorination is a surface treatment only, the percentage of chlorine in a polyethylene film required to produce the desired results depends on the thickness of the film. In general, to obtain the results herein described, the relationship of the chlorine content to the film thickness is defined by the following equation:

$$\text{Per cent chlorine} = m \cdot \frac{1}{T}$$

where

T equals film thickness in mils; and $m$ is a coefficient of conversion which can vary from 1.35 for minimum chlorine content to 4.5 for maximum chlorine content.

The following table shows the minimum and maximum chlorine contents of polyethylene films of different illustrative thickness:

Table

| Film Thickness in mils | Chlorine Content | |
|---|---|---|
| | Max. $= 4.5\frac{1}{T}$ | Min. $= 1.35\frac{1}{T}$ |
| | Per cent | Per cent |
| 1 | 4.5 | 1.35 |
| 2 | 2.25 | 0.675 |
| 4.5 | 1.00 | 0.30 |
| 6 | 0.75 | 0.225 |

The conditions of the chlorination reaction are adjusted in accordance with the film thickness and the desired chlorine content (within the range hereinbefore described) in the product.

Though in the preferred embodiment of the process the reaction is carried out under room temperature and atmospheric pressure, the invention is not restricted thereto. The reaction can be performed at elevated temperatures and under either elevated or reduced pressures. When such conditions are employed, the period of contact between the film and the gaseous chlorine must be corelated with the other conditions of the reaction to impart the desirable surface characteristics without substantially impairing or dulling the original transparency of the film.

The reaction with the gaseous chlorine is preferably carried out in the presence of or under the influence of light. The light, which apparently serves as a catalyst, can be obtained from sources other than that specifically hereinbefore mentioned. The precise degree of illumination for any particular set of conditions can be determined by simple empirical experiment.

Though the process has been described as being carried out in a vertically disposed reactor, it is apparent that the reactor can be otherwise disposed, such as, for example, in a horizontal direction. Similarly, the tunnel 32 can either be vertical, horizontal or otherwise, and irrespective of the position of the reactor.

Though the chlorination method herein described is preferred, the invention is not restricted thereto. The surface of polyethylene film can be chlorinated by any chlorination method provided the chlorine content of the product is within the limits hereinbefore described.

The method of the present invention is particularly suitable for use in connection with polyethylene films either in the form of collapsed seamless tubing or sheeting. It can be applied to any structure of polyethylene, the surface of which is desired to be modified so that it can be satisfactorily imprinted as hereinbefore described. The polyethylene structure can contain such modifying agents as desired.

Herein the term "transparent film" defines a film which permits an object placed in the rear and in contact with the film to be visible to an observer in front of the film.

The invention provides a transparent polyethylene film which can be printed in the usual manner with drying oil or lacquer inks used in printing cellulosic materials, and the dried imprinted impressions will firmly and tenaciously adhere thereto and effectively resist abrasion and such other treatments to which the printed film may be subjected during its life and until it reaches the consumer.

Since it is obvious that many changes and modifications can be made in the above-described details without departing from the nature and spirit of the invention, it is to be understood that the invention is not to be limited thereto except as set forth in the appended claims.

I claim:

1. A process for treating polyethylene films which consists in subjecting the surface of such films to the action of gaseous chlorine to form a superficially chlorinated polyethylene surface, and then imprinting such chlorinated surface with a printing ink.

2. A process of treating transparent polyethylene films which consists in subjecting the surface of said films to the action of gaseous chlorine to form a film having a transparent superficially chlorinated polyethylene surface and a chlorine content as defined by the equation $$\text{Per cent chlorine} = m \cdot \frac{1}{\text{thickness of film in mils}}$$

where $m$ is at least 1.35 and not higher than 4.5, and thereafter imprinting such chlorinated surface with a printing ink.

3. A process as set forth in claim 2 wherein the chlorine-containing gases are removed from the treated surface prior to printing.

4. A process for treating polyethylene structures which consists in superficially chlorinating the surface of said structures and then imprinting such chlorinated surface with a printing ink.

5. A process for treating polyethylene structures which consists in subjecting the surface of such structures to the action of gaseous chlorine to form a superficially chlorinated polyethlene surface and then imprinting such chlorinated surface with a printing ink.

6. A transparent polyethylene film having a transparent superficially chlorinated polyethylene surface imprinted with a printing ink of the class which consists of drying oil and lacquer inks.

7. A transparent polyethylene film as set forth in claim 6 wherein the degree of chlorination of said surface is such that the chlorine content of the film, prior to printing, is as defined by the equation $$\text{Per cent chlorine} = m \cdot \frac{1}{\text{thickness of film in mils}}$$

where $m$ is at least 1.35 and not higher than 4.5.

8. A transparent polyethylene film as set forth in claim 6 wherein the film is 4.5 mils in thickness and the degree of chlorination of said surface is such that the chlorine content of the film, prior to printing, is from about 0.3% to 1.00%.

9. A transparent polyethylene film as set forth in claim 6 wherein the film is 4.5 mils in thickness and the degree of chlorination of said surface is such that the chlorine content of the film, prior to printing, is from about 0.5% to 1.00%.

WILLIAM F. HENDERSON.

REFERENCES CITED

The following references are of record in the file of this patent:

UNITED STATES PATENTS

| Number | Name | Date |
|---|---|---|
| 2,126,733 | Catt | Aug. 16, 1938 |
| 2,276,951 | Fisher | Mar. 17, 1942 |
| 2,291,574 | Gleason | July 28, 1942 |
| 2,316,481 | Whittaker | Apr. 13, 1943 |
| 2,400,720 | Staudinger | May 21, 1946 |